July 6, 1937.　　　P. F. DONAHUE　　　2,086,017
SHOWER HEAD
Filed July 10, 1936
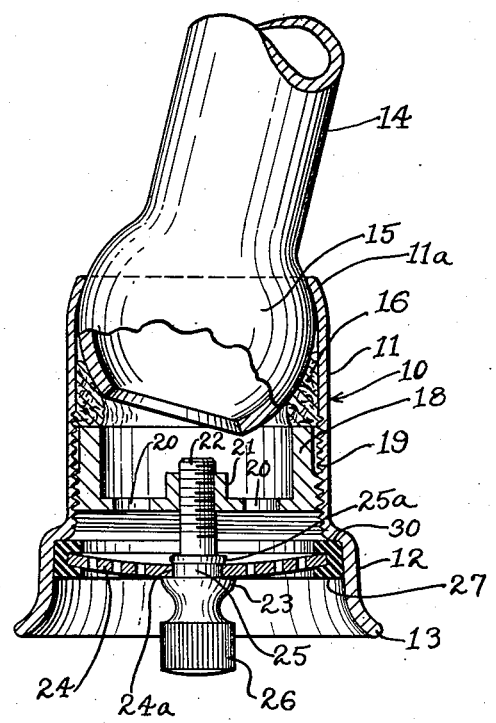
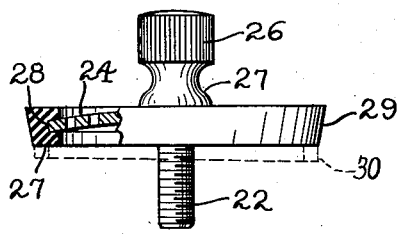
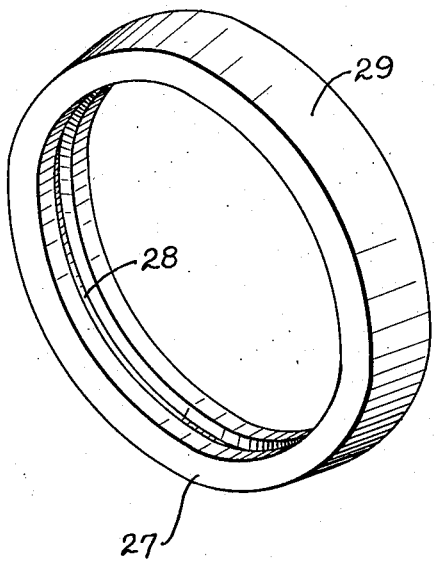
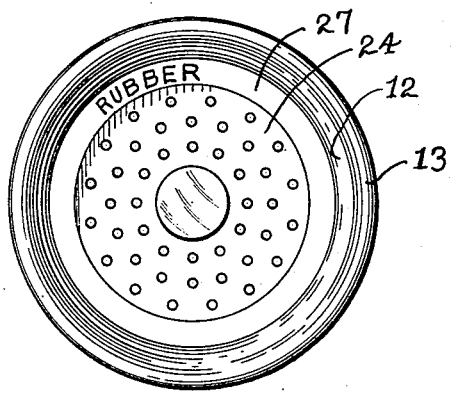
INVENTOR
Patrick F. Donahue,
BY Harold F. Johnston
ATTORNEY Patented July 6, 1937

2,086,017

UNITED STATES PATENT OFFICE 2,086,017

SHOWER HEAD

Patrick F. Donahue, Waterbury, Conn., assignor to Scovill Manufacturing Company, Waterbury, Conn., a corporation of Connecticut Application July 10, 1936, Serial No. 89,936

13 Claims. (Cl. 299—141)

This invention relates to shower heads and its principal object is to provide an improved seal between the perforated disc and the body of the shower head, and means of attaching same.

Heretofore, the old type of flat annular sealing gasket or washer employed for a sealing means has not been without its faults, as for instance, when the shower head was disassembled for cleansing or repair purposes, the sealing washer would either drop out from its respective seat, or if used for a considerable length of time the deteriorated washer would become "frozen" within its seat, and thus necessitate the destructive prying out of the washer with some tool, which act was very liable to cause either a marring of the polished finish of the shower head or otherwise injuring the same. Furthermore, the fact that the parts would readily fall apart when disassembled was an annoying factor in cleaning the shower head.

Therefore, the object of this invention is to provide a shower head perforated disc that has a sealing member and retaining screw assembled to it as a unit, and which unit is adapted to be removably secured to the shower head. Furthermore, the means by which the disc and assembled sealing ring is attached to the head is such that it is axially assembled in place or moved therefrom without relative twisting to the head.

In carrying out the object of this invention, there is provided an annular gasket of rubber or other compressible material having a groove formed in the interior periphery, and said gasket is adapted to be stretched and sprung over the outer circular edge of the disc to allow said edge to engage in said groove, thus causing the gasket to snap into assembled position thereabout.

Other objects and advantages of this invention will be apparent during the course of the following description:

In the accompanying drawing forming a part of this specification, and in which like reference numerals are employed to designate like parts through the same.

Fig. 1 is a vertical sectional view of a shower head embodying the invention.

Fig. 2 is a full end view of the same.

Fig. 3 is a side elevation of the removable spray-disc unit with a portion broken away to better show the construction.

Fig. 4 is an enlarged prospective view of the sealing ring or gasket, per se.

In the drawing wherein for the purpose of illustration is shown a preferred embodiment of the invention, numeral 10 designates generally a shower head which comprises a tubular body member 11 having at its lower end an enlarged slightly tapered portion 12 terminating in an outwardly flared flange 13.

The body 11 is connected to the end of a conduit pipe 14 in such a manner as to afford universal adjustment through the instrument of a substantially hollowed ball-like joint 15 swelled at the terminal end of the conduit 14. As best shown in Fig. 1, the size of the ball joint 15 is such as will readily slide inwardly through the tubular body 11 from the front thereof for assembly purposes, and the upper end of said body 11 is slightly formed inwardly at 11a to a diameter less than that of the joint 15 to effect a suitable ball and socket joint between the parts.

The head 10 is held in frictional liquid tight position upon the ball joint by means of an annular ring of packing material 16 which engages a portion of the spherical surface of the ball joint 15 and is pressed thereagainst to produce the proper seal and desired frictional resistance, as by means of an adjustable cup shaped gland 18 having threaded engagement with the interior threaded portion 19 of the body 11. The base end of the gland 18 is provided with suitable openings 20 to permit the passage of liquid therethrough and a concentric upstanding tapped boss 21 is formed integral therewith. Tapped boss 21 is adapted to receive the threaded shank 22 of an assembly screw 23, hereinafter referred to.

Positioned in spaced relation within the enlarged end 12 of the shower head 10 is a perforated face-plate or disc 24 which is preferably made slightly concavo-convex in shape. The disc 24 is provided with a central aperture 24a for bearing engagement with an intermediate cylindrical neck portion 25 of the screw 23, the inner face or edge of said neck portion 25 being swaged or otherwise upset as at 25a to permanently assemble the said disc with said screw in such a manner as to afford relative rotation between the two parts. The outer end of screw 23 is integrally formed with an enlarged knurled head 26 extending a sufficient distance beyond the disc 24 and flared edge 13 of the head to be readily accessible for removable and assembling purposes.

In order to effect a satisfactory seal between the disc 24 and the shower head, provision is made of an annular sealing gasket or ring 27 made of rubber or other similar substance. In accordance with the object of this invention, the gasket 27 is provided in its interior peripheral surface with an incut groove or annular recess 28 for receiving the edge of the disc 24. In assembling the gasket 27 to its respective disc 24, the gasket is necessarily slightly stretched over the circular edge of the disc 24 to a position wherein the edge of said disc 24 will aline and engage in the gasket recess 28 allowing the stretched gasket to snap back to its normal state about the disc 24, and thus retain the parts together as an assembled unit. The outer peripheral surface of the gasket 27, as noted in the several views, is preferably slightly beveled as at 29 to conform to the enlarged tapered portion 12 of the head 10.

It will be readily apparent from the simplified construction illustrated in the drawing that the perforated disc 24, attached gasket 27 and assembly screw 23 are readily assembled as a unit to the shower head with very little trouble and effort, by merely aligning and engaging the threaded shank 22 with the tapped boss 21 of the packing gland 18 and rotating the knurled head 26 of the screw 23. Furthermore, the fact that the assembly screw 23 rotates relative to the disc 24 and the gasket 27, said disc 24 and gasket 27 will naturally be drawn coaxially into the enlarged section 12 of the head 10 without lateral rotation; thus allowing the gasket 27 to firmly engage in its corresponding seat 30 formed at the junction shoulder provided between the enlarged tapered portion 12 and the tubular portion 11 of the head without buckling or otherwise distorting the gasket 27. It is also to be noted that this particular construction of washer necessitates one made of relatively thick material, and the fact that its outer surface is beveled and drawn into tight engagement with a corresponding restricted beveled surface of the tapered portion 12 is conducive in producing a double sealing surface between the gasket and the head in different angular planes.

As previously mentioned, the disc 24 and complementary gasket 27 are drawn coaxially inwardly into the section 12 of the head 10 without relative rotation in assembling for reasons above stated, and within the same scope it will be evident that the structure readily lends itself to the feature of removing the disc 24 and gasket 27 coaxially from the head by the manipulation of the screw 23 in a manner similar to a screw jack. Thus, there will be no necessity of having to pry out the sealing gasket 27 for renewal or cleaning purposes, as it will always be drawn out with the disc.

While the sealing gasket 27 has been described as being made of rubber or similar material, it is to be understood that it is also within the purview of this invention to make the gasket of lead or other metal of similar characteristics, in which case the gasket will first be formed with a depending skirt as shown by the dotted lines in Fig. 3 and indicated by the numeral 30. It will be quite obvious that the lead gasket may be easily assembled around the edge of the disc 24 by merely forming the skirt 30 inwardly against the adjacent surface of said disc 24 to the full line position, as shown by the rubber gasket in the same Fig. 3.

Other novel features and their resulting advantages will be apparent to those skilled in the art, and since certain changes may be made in the above construction and different embodiments of invention could be made without parting from the scope thereof, it is intended that all matter contained in above description shown in the accompanying drawing, shall be interpreted as illustrative and not in a limiting sense.

The invention, being thus described, what is claimed is:

1. In a shower head, a body having a shouldered seat, a perforated disc associated with said body, an annular gasket having means for embracing the outer peripherial edge of said disc to be retained in assembled position thereabout, and means for holding said disc and complementary gasket in assembled position against the shouldered seat in said head.

2. In a shower head, a body having a seat, a perforated disc, an annular gasket having an interior groove for receiving the edge of said disc for holding said gasket and said disc together as a unit, and binding means associated with said disc for holding the latter in its respective assembled position in said body and adapted to compress a portion of said gasket against said seat.

3. In a shower head, a body having a seat, a perforated disc, an annular gasket having an interior groove for receiving the edge of said disc for holding said gasket and said disc together as a unit, and binding means associated with said disc and having relative rotation thereto for holding the latter in its respective assembled position in said body and compressing a portion of said gasket against said seat.

4. In a shower head, a body having an enlarged head with a connecting shoulder therebetween, a spray plate, a compressible sealing gasket having an interior groove for engaging about the edge of said plate to hold said parts together as a unit, and screw means having bearing engagement and relative rotation with said disc and adapted for detachably holding said disc and its complementary gasket in assembled position in said head against the shoulder in liquid tight engagement.

5. In a shower head in combination, a body having an enlarged head and a connecting annular shoulder therebetween, a perforated shower disc, an annular rubber gasket having a cut-out recess provided in its interior periphery for receiving said disc whereby the annular gasket will be caused to embrace the opposite annular surface of said disc adjacent its peripherial edge, an assembly screw having rotative connection with said disc, and means in said body for receiving said screw for holding said disc and attached gasket in assembled liquid tight engagement within said body against said shoulder.

6. In a shower head, a body having a sealing seat, a perforated shower plate, a sealing gasket of substantially rectangular shape in cross-section and having means for engaging about the edge of said plate as an assembled unit, a screw having assembled rotative connection with said disc, and means in said body for receiving said screw whereby said disc and supported gasket are adapted to be drawn coaxially into said body against said shoulder in liquid tight engagement.

7. In a shower head, a body having a sealing seat, a perforated shower plate having a bearing aperture, an assembly screw comprising a threaded shank, an intermediate shouldered neck and an enlarged handle knob, said neck having rotative engagement in said aperture, and the shoulder thereof engaging the outer surface of said plate surrounding said aperture, a grooved gasket adapted for assembled engagement about the edge of said plate, and means in said body for threadedly receiving said threaded shank whereby said plate and complementary gasket may be drawn into liquid tight seal against the seat in said head.

8. In a shower head, a tubular body having an enlarged flared head with an intermediate connecting annular shoulder forming an interior seat, a perforated shower disc having a concentric bearing aperture, an assembly screw comprising a threaded shank, an intermediate shouldered neck of larger diameter than said shank, and an enlarged knurled handle knob, said neck having rotative engagement in said aperture and the shoulder thereof engaging the outer surface of said disc surrounding said aperture, the inner face of said neck being upset against the adjacent surface of said disc to hold said screw and disc in assembled relationship, a grooved gasket adapted to be snapped into retained engagement about the edge of said disc, and means in said body for threadedly receiving said threaded shank whereby said disc and complementary gasket may be drawn coaxially into the enlarged head in said body in tight contact against said seat.

9. In a shower head, a body having a shouldered seat, a perforated shower plate associated with said body, a sealing gasket having means for embracing the outer peripherial edge of said plate to be retained in assembled position thereon, and means rotatably connected to said plate for holding said plate and complementary gasket in assembled position against the shouldered seat in said head.

10. In a shower head, a body having a shouldered seat, a shower plate, a gasket member being of such form as to embrace the peripherial edge of said plate in detachable assembly, and a screw means having permanent rotatable assembly with said plate whereby said plate and said gasket may be coaxially moved into and out of sealing engagement with said seat without relative rotation thereto.

11. In a shower head, a body having an interior seat, a shower plate, a sealing gasket formed to embrace the edge of said plate as an assembled member, means having permanent rotatable assembly with said plate, and means in said head for receiving said first mentioned means, whereby said plate and gasket may be drawn coaxially inwardly and outwardly of the seat in said body without relative rotation thereto.

12. In a shower head, for attachment to a conduit pipe, a body having a sealing seat, a ball and socket connection between said body and said conduit, a packing, a cup shaped gland member having a threaded connection within said body and adapted for pressing said packing against the ball part of said connection, to effect a liquid tight seal between said connection and said body, the base of said gland provided with attaching portion and one or more liquid passages, a shower plate, a gasket member embracing the edge of said plate and carried thereby, and means associated with said plate and engaging said attaching portion whereby said plate and gasket may be assembled coaxially into and out of liquid tight engagement with the seat in said body without relative rotation thereto.

13. In a shower head, a body having an enlarged head with an intermediate connecting annular transverse shoulder, the said walls of said head having a slight taper, a perforated disc, a sealing gasket embracing the outer edge of said disc and carried thereby and having its outer periphery beveled to match the head taper, and means for assembling said disc and complementary gasket coaxially into the body head without relative rotation between the respective parts to compress the gasket into liquid tight engagement with the adjacent tapered wall and transverse shoulder of the head.

PATRICK F. DONAHUE.